United States Patent [19]

Waber

[11] Patent Number: 5,203,385
[45] Date of Patent: Apr. 20, 1993

[54] APPARATUS AND PROCESS FOR AUTOMATICALLY RECONSTITUTING DRY MATERIALS, ESPECIALLY PHARMACEUTICALS

[76] Inventor: Donald Waber, 1155 Fort St. Mall, Suite 132, Honolulu, Hi. 96813-2706

[21] Appl. No.: 861,321

[22] Filed: Mar. 31, 1992

[51] Int. Cl.⁵ ............................................. B65B 3/30
[52] U.S. Cl. .................................... 141/69; 141/83; 141/1; 366/111; 366/112; 366/212
[58] Field of Search ................. 141/69, 71, 72, 83, 141/1; 366/111, 112, 209, 209, 210, 211, 212

[56] References Cited

U.S. PATENT DOCUMENTS

| | | |
|---|---|---|
| 3,491,503 | 1/1970 | Ashton et al. |
| 3,503,592 | 3/1970 | Taylor, Sr. et al. .............. 366/212 |
| 3,517,913 | 6/1970 | Van Rossem ................... 366/112 |
| 3,575,099 | 4/1971 | Levenson et al. ............. 141/83 X |
| 3,635,446 | 1/1972 | Kurosawa et al. ............... 366/112 |
| 4,061,315 | 12/1977 | Eitzen et al. ..................... 366/111 |
| 4,350,186 | 9/1982 | Schalkowsky et al. ............ 141/83 |
| 4,415,011 | 11/1983 | Grant ............................. 141/284 |
| 4,513,796 | 4/1985 | Miller et al. ..................... 141/87 |
| 4,712,590 | 12/1987 | Gianfilippo ....................... 141/87 |
| 4,789,014 | 12/1988 | DiGianfilippo et al. ............ 141/83 |
| 4,832,092 | 5/1989 | Hirose et al. ...................... 141/1 |
| 4,845,025 | 7/1989 | Lary et al. .................... 366/111 X |
| 5,049,129 | 9/1991 | Zdeb et al. ....................... 604/85 |
| 5,056,568 | 10/1991 | DiGianfilippo ..................... 141/1 |

*Primary Examiner*—Ernest G. Cusick
*Attorney, Agent, or Firm*—Martin E. Hsia

[57] ABSTRACT

An apparatus and process for reconstituting dry pharmaceuticals and other materials in which a peristaltic pump controlled by a timer automatically dispenses the desired amount of solvent to reconstitute a pharmaceutical at an appropriate concentration and an agitator, preferably also controlled by the timer, mixes the pharmaceutical and solvent.

11 Claims, 3 Drawing Sheets

APPARATUS AND PROCESS FOR AUTOMATICALLY RECONSTITUTING DRY MATERIALS, ESPECIALLY PHARMACEUTICALS

This invention relates to an apparatus and process for automatically reconstituting dry (or dehydrated) materials, especially pharmaceuticals.

Many materials, especially including pharmaceuticals, are shipped and stored in a dry (or dehydrated) state because shipment or storage in a liquid state would be impractical. For example, the shelf life of a liquid antibiotic pharmaceutical may be only a matter of days or weeks. If the pharmaceutical is dry (or dehydrated), the shelf life may be extended for up to several months or even years. Dry (or dehydrated) materials include both materials that are first converted to a liquid form by the addition of a liquid ("solvent") and materials from which a liquid (solvent) has been removed. Solvents can include water, dextrose or saline solutions, oil, or other liquids. As used herein, the term "solvent" includes not only liquids that dissolve dry (or dehydrated) materials, but also includes liquids in which dry (or dehydrated) materials can be suspended or mixed. For ease of reference, the term "dry" will hereinafter be understood as including "dehydrated". The conversion of a dry material to a liquid state by adding a solvent will be referred to as "reconstitution", regardless of whether the dry material had ever previously been constituted in a liquid state. Accordingly, reconstitution includes "constitution", "mixing" and words of similar import. A "liquid state" shall include solutions, suspensions, and any other form in which the dry material can be converted to a liquid for use, dispensing or administration.

It is the present practice and custom in the pharmaceutical industry for many pharmaceuticals to be received by a pharmacist in a dry state. Usually, the dry pharmaceutical will be provided in a container suitable for use in reconstituting the pharmaceutical merely by adding a specific amount of water or other solvent to the container and agitating the container. The dry pharmaceutical can then be stored until a patient presents a prescription to the pharmacist for that pharmaceutical. The pharmacist must then reconstitute the dry pharmaceutical by adding the correct amount of water or other solvent to the container and agitating the container to achieve proper dissolving, mixing or suspension to convert the dry pharmaceutical to the liquid state.

Accuracy in adding the correct amount of solvent to a dry pharmaceutical is critical because adding the wrong amount of solvent will result in a reconstituted pharmaceutical of the wrong concentration. Further, mixing of the dry pharmaceutical and the solvent must be performed properly because the dry pharmaceutical may have become caked in the container during storage, and the pharmaceutical might not mix, dissolve or suspend completely, again resulting in the wrong concentration. The dangers of improper reconstitution are especially acute in pediatric pharmaceuticals because the dosages are smaller so there is less tolerance for error.

Reconstitution must be carried out in a manner that avoids contamination of the reconstituted pharmaceuticals, although reconstitution need not be sterile in many cases. Because of the critical nature of reconstitution, pharmaceuticals are still manually reconstituted by a pharmacist or other highly trained person, as they have been for many years. This severely reduces the efficiency and productivity of any pharmacy because the pharmacist must painstakingly and accurately measure the appropriate amount of solvent into the container to achieve the correct concentration and then must be sure that the resulting liquid is dissolved, mixed or suspended sufficiently thoroughly. Accordingly, there is a great need to automate the process of reconstituting dry pharmaceuticals so that a pharmacist may conduct other activities while a pharmaceutical is being reconstituted. However, no automated apparatus for reconstituting pharmaceuticals is available, presumably because the appropriate amount of solvent must be accurately dispensed in order to achieve a correct concentration during the reconstitution process, which compels a pharmacist to closely supervise the reconstitution of every prescription.

Several patents have been issued for apparatus for precisely filling containers with sterile liquid.

U.S. Pat. No. 3,491,503 to Ashton relates to a general apparatus for using a peristaltic pump for precisely filling containers with sterile liquids. A peristaltic pump maintains sterility by repeatedly squeezing a flexible tube to push liquid out of the tube so that the liquid does not come into contact with any parts of the pump.

U.S. Pat. No. 4,513,796 to Miller and U.S. Pat. No. 4,712,590 to Gianfilippo disclose apparatus and methods for compounding solutions for use in intravenous feeding.

U.S. Pat. No. 5,049,129 to Zdeb et al, discloses a medical fluid administration set for passive reconstitution and delivery of a drug or other beneficial agent in an intravenous system.

None of the above references relates to automated reconstitution of dry pharmaceuticals by a pharmacist or discloses the use of an agitator. Miller, Gianfilippo and Zdeb et al. all relate to compounding of multiple liquids, although Zdeb does mention various references relating to reconstitution of drugs from a dehydrated state.

It is therefore an object of this invention to provide an apparatus and method for automatically reconstituting dry materials, including pharmaceuticals.

It is a further object of this invention to provide such an apparatus and method that can be controlled to dispense a wide range of amounts of a solvent to accommodate a pharmacist's needs to reconstitute pharmaceuticals of varying concentrations and in varying amounts.

It is a still further objective of this invention to provide such an apparatus and process that is simple to use and easy to manufacture and that requires a minimum of supervision by a pharmacist once the initial control settings have been selected.

It is a still further object of this invention to provide an apparatus and process that can be used for reconstituting pharmaceuticals in the wide range of concentrations necessary for pediatric use.

BRIEF SUMMARY OF THE INVENTION

These and other objects are achieved by an apparatus comprising an automatic dispensing means for automatically dispensing predetermined amounts of a solvent into a container for a dry material and an agitator means for agitating the container adjacent to the dispensing means. Preferably, the dispensing means comprises a peristaltic pump and a pump control means for controllably activating the pump, such as a timer. Although not preferred, the dispensing means for automatically dispensing predetermined amounts of solvent could include other types of pumps, including chemical metering pumps or standard pumps with a separate metering device. Preferably, also, the apparatus is provided with an agitator control means for controllably activating the agitator, such as a timer, which preferably also controls the peristaltic pump. It is further preferred that the peristaltic pump have an adjustable range of flow rates between approximately 15 milliliters per minute and approximately 220 milliliters per minute. Preferably, each part of the invention is housed in a separate self contained module for ease of maintenance and replacement.

DETAILED DESCRIPTION OF A PREFERRED EMBODIMENT

Figure 1:
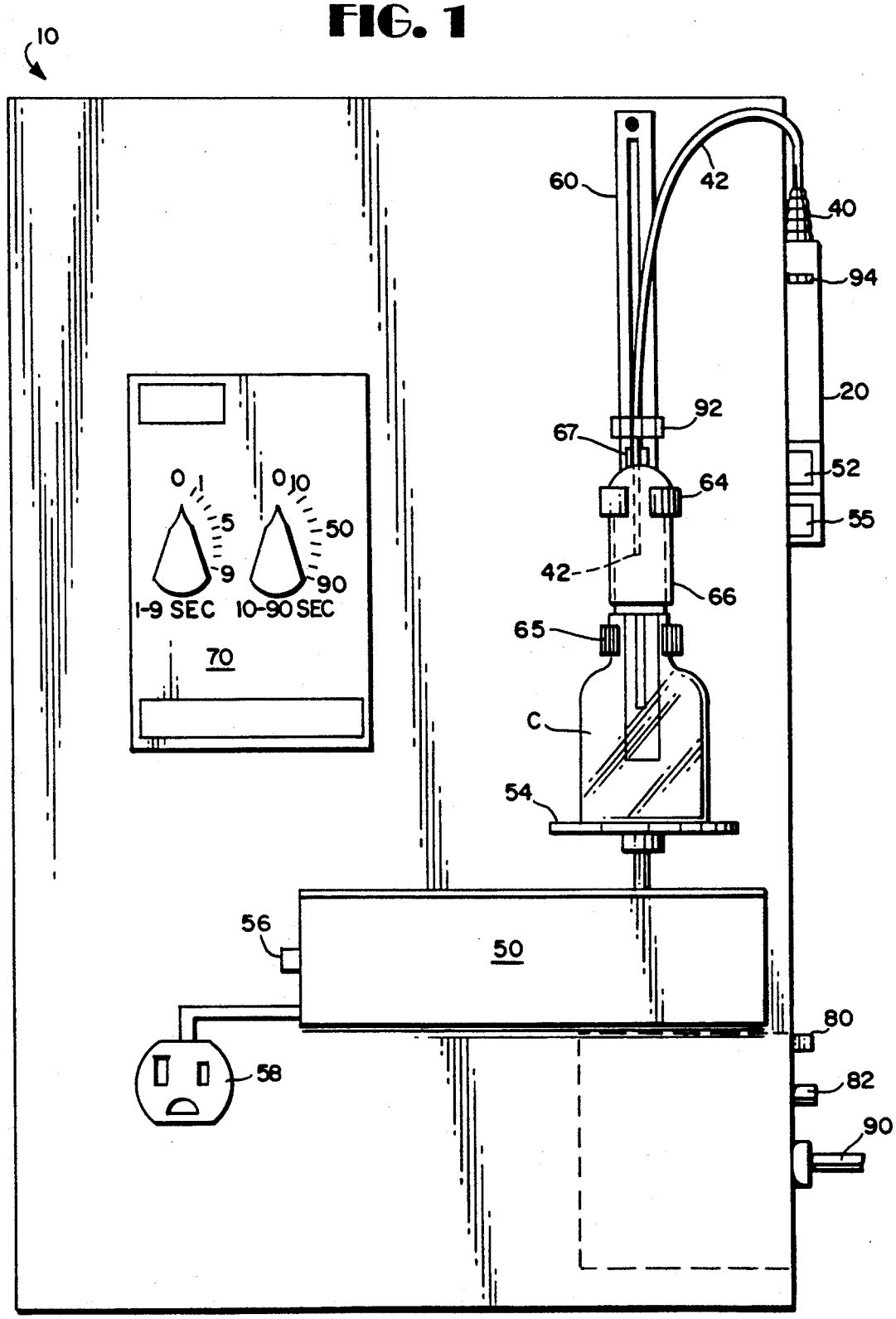
FIG. 1 shows a front view of a preferred embodiment of the invention.
Figure 2:
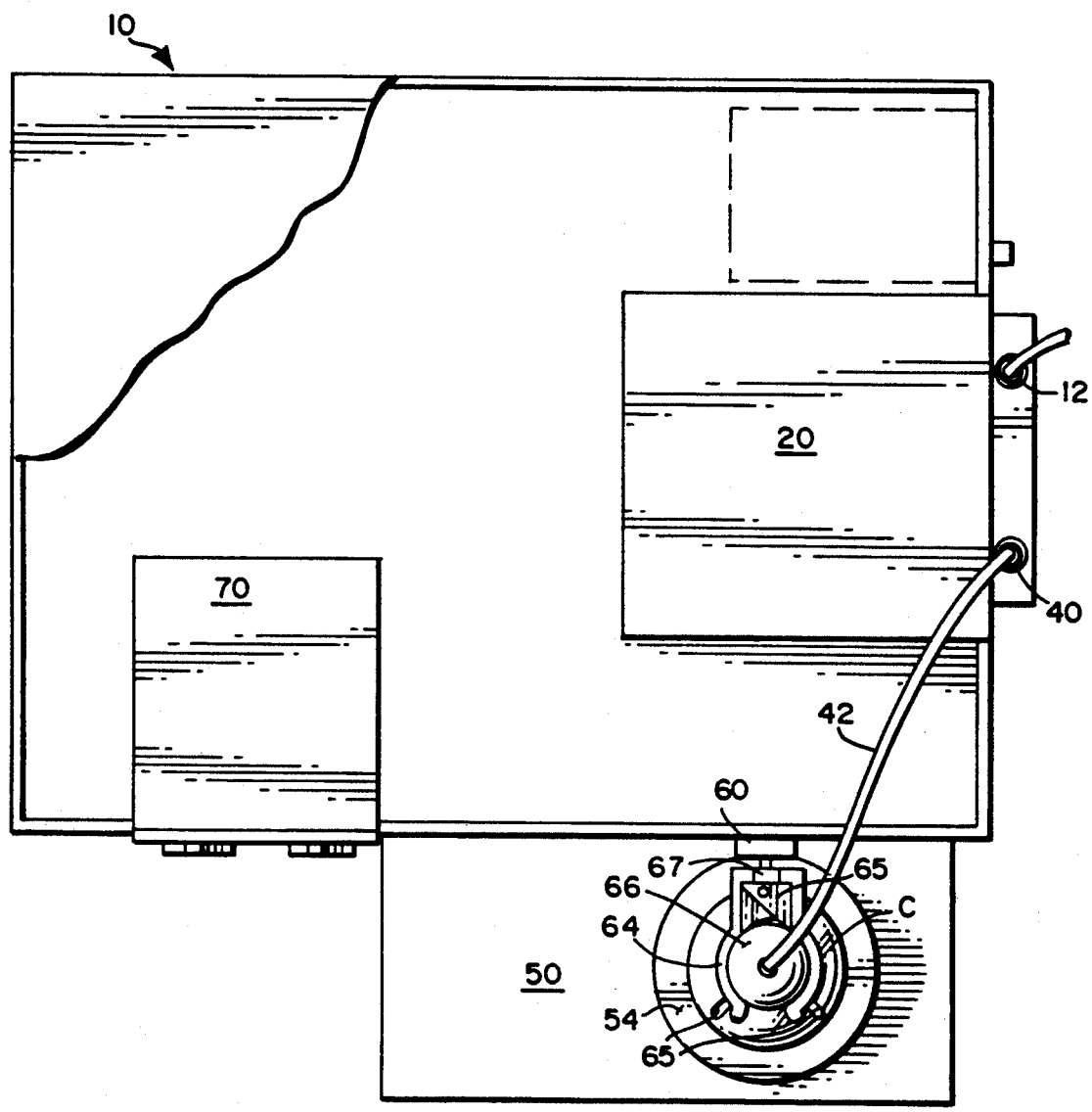
FIG. 2 shows a top view of the embodiment shown in FIG. 1.

Referring to FIGS. 1 and 2, shown is a preferred embodiment of the present invention. A main housing 10 houses a peristaltic pump 20 of conventional construction. The peristaltic pump 20 is provided with a water inlet 12 adapted for connection to a preexisting source of water or other solvent and also is provided with a water outlet 40. A feeder tube 42 is connected to the water outlet 40. This construction allows for easy replacement of the peristaltic pump 20 and its tubing in case of mechanical or other failure.

An agitator 50 of conventional design is preferably attached to the front of the main housing 10 and preferably is provided with a platform 54 onto which a container C containing a dry pharmaceutical to be reconstituted can be placed. The agitator 50 is also preferably provided with a slide switch 56 with high, low and off positions, the high setting being preferable. The agitator 50 is preferably powered from an AC outlet 58 provided in the housing 10 so that the agitator 50 can be easily removed for maintenance, repair or replacement. The housing 10 is preferably provided with an upwardly extending holder slide 60 that is provided with a top slidably mounted bracket 64 and a bottom slidably mounted spring loaded bracket 65, preferably mounted to slide as a unit, thus maintaining a fixed separation between them. The top bracket 64 is preferably adapted to hold a splash guard 66 comprising a substantially bell shaped member having a hole at the top configured to receive the outlet tube 42. The outlet tube 42 then is pushed through the hole in the splash guard 66 until it optimally extends approximately halfway towards the bottom of the splash guard. Preferably the outlet tube 42 has a constant inside diameter of approximately one quarter inch except for the portion inside the splash guard 66. The outlet tube 42 preferably tapers from an inside diameter of approximately one quarter inch where it enters the splash guard 66 to an inside diameter of approximately one eighth inch at its end. This tapering of diameter appears to increase the pressure and help direct the flow of solvent through the outlet tube 42 into the container C.

The bottom bracket 65 is preferably adapted to hold the neck of the container C at a fixed distance of approximately one quarter inch from the bottom of the splash guard 66 when the container C is placed on the agitator platform 54. The bottom bracket 65 also holds the container C in an operative relationship with the agitator 50 so that the agitator will operate to agitate the container C when activated if the container C is held by the bottom bracket 65. The lower bracket 65 is preferably spring loaded to be able to hold containers having a variety of diameters. The container C will still be sufficiently agitated for mixing when the agitator platform 54 agitates, even though the neck of the container C is held by the lower bracket 65. However, because agitation of the agitator platform 54 tends to cause the brackets 64 and 65 to move upwards on the slide 60, it is preferred that a frictional latch 67 be provided on the holder slide 60 above the brackets 64 and 65 to prevent this "riding up."

Preferably the action of the peristaltic pump 20 is controlled by a timer 70 or other means for controlling the amount of solvent dispensed through the feeder tube 42. Such other means could include, for example, an optional volume sensor 92 or counter 94. The timer 70 preferably has controls for selecting activation times in increments of 1 second and 10 seconds, such as two dials, one ranging from 1 to 9 seconds and the other ranging from 10 to 90 seconds. Preferably, a motor speed control 52 is provided for the motor of the peristaltic pump 20. For safety, the peristaltic pump 20 also can be provided with a motor fuse 55. Preferably the motor speed control 52 and motor fuse 55 are mounted directly on the peristaltic pump 20 for ease of removal of the peristaltic pump 20 for maintenance, repair and replacement.

The peristaltic pump 20 preferably has an adjustable flow rate that encompasses a range that includes a minimum of approximately 15 milliliters per minute up to a maximum of approximately 220 milliliters per minute. If a separate timer is provided for the agitator, then a larger capacity peristaltic pump can be used because agitation can continue after the peristaltic pump has dispensed all of the liquid.

The entire apparatus is preferably electrically powered through a power cord 90, a master switch 80, and a circuit breaker 82.

Figure 3:
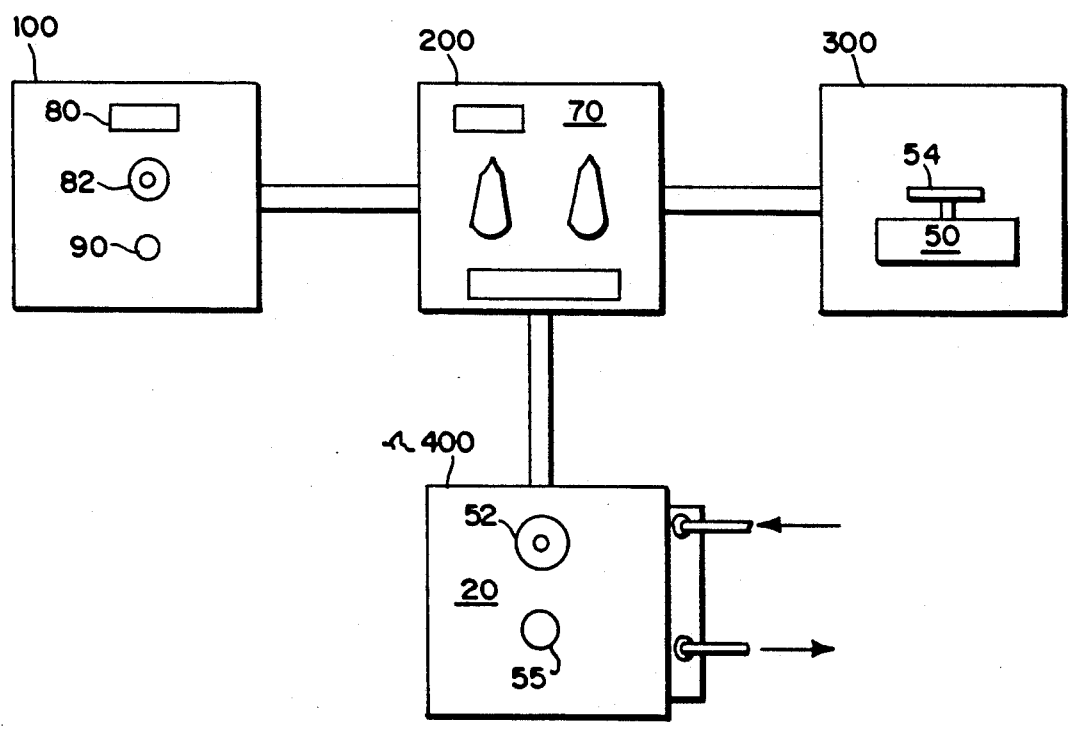
FIG. 3 shows a schematic view of the modules of the embodiment shown in FIG. 1.

Referring to FIG. 3, shown is a schematic view of all the elements of the preferred embodiment housed in self contained modules. Thus, the first module 100 contains the master switch 80, circuit breaker 82 and power cord 90. The second module 200 contains the timer 70. The third module 300 contains the agitator 50 and agitator platform 54. The fourth module 400 contains the peristaltic pump 20, the motor speed control 52 and the fuse 55. Each of these modules is mounted on or in the housing, and will be referred to as "attached" to the housing.

Chemical metering pumps or other types of pumps with separate metering devices can be used instead of the peristaltic pump 20, but are not preferred because of the increased difficulties of maintenance, repair and replacement as compared with peristaltic pumps. A peristaltic pump works by squeezing tubing that transports the solvent and the solvent therefore does not come into contact with the pump at all. If the tubing of the peristaltic pump becomes dirty or otherwise fails, such minor problems can often be solved merely by replacing the tubing. Solving minor problems with other types of pumps normally would involve disassembling and replacing parts of the pump itself, in addition to the tubing.

In use, a container C containing a dry pharmaceutical to be reconstituted would be placed on the agitator platform 54 and held by the bottom bracket 65. The pharmacist or other operator would then set the timer 70 for the appropriate time period to dispense the desired amount of solvents through the feeder tube 42 and into the container C. The agitator 50 would preferably be activated by the same timer that activates the peristaltic pump 20. Obviously, this would result in agitation of the container C before much solvent is dispensed into the container C, but this early agitation would help to break up any clumps or cakes of the pharmaceutical that might be in the container C, thus enhancing the reconstitution of the pharmaceutical.

It is presently preferred (but not required) that the container C be agitated during the entire period that the solvent is being dispensed into the container C. It is also preferred that the solvent be dispensed at a rate that is sufficiently slow to ensure thorough reconstitution, yet is sufficiently fast that the reconstitution period can be kept comparatively short. The preferred rate of reconstitution is presently between approximately 1 and 3 milliliters per second if agitation stops after all the solvent has been dispensed into the container C. However, if agitation will continue after all the solvent has been dispensed into the container C (which could be accomplished by a separate timer for the agitator 50), then the preferred rate of reconstitution would be 4 milliliters per second or higher.

Although it is presently preferred that the amount of liquid to be dispensed through the feeder tube 42 be controlled by a timer activating a peristaltic pump, other methods for precisely controlling the appropriate amount of solvent dispensed into the container C also can be employed. Such alternate methods are within the scope and intent of this invention and could include, for example, apparatus that directly monitors the volume of solvent being added to the container C, a weight sensor operatively connected to the platform 54 for determining the weight of solvent added to the container C, or a counter that counts the number of cycles of the pump 20.

The present invention has been described with respect to a particular embodiment. However, it will be obvious to those skilled in the art that modifications and alterations can be made to the disclosed embodiment without departing from the scope and spirit of the invention. Accordingly, no limitations are to be inferred or implied except as specifically set forth in the appended claims.

What is claimed is:

1. An apparatus for reconstituting a dry material that has been stored in a storage container without removing said dry material from said container, comprising:
   an automatic dispensing means for automatically dispensing a predetermined amount of a solvent into said container, wherein said dispensing means dispenses said solvent at a flow rate of at least approximately 1 milliliter per second; and
   an agitator means for agitating said solvent and said dry material in said container adjacent to said dispensing means.

2. An apparatus according to claim 1, wherein said automatic dispensing means comprises:
   a dispenser control means for activating said automatic dispensing means and for automatically deactivating said automatic dispensing means when said predetermined amount has been dispensed into said container.

3. An apparatus according to claim 2, wherein said dispenser control means also activates and deactivates said agitator means.

4. An apparatus according to claim 3, wherein said dispenser control means comprises a timer.

5. An apparatus according to claim 1, wherein said automatic dispensing means comprises:
   a peristaltic pump; and
   a pump control means for activating said pump and for automatically deactivating said pump when said predetermined amount has been dispensed into said container.

6. An apparatus according to claim 5, wherein said pump control means comprises a timer.

7. An apparatus according to claim 5, wherein said pump control means comprising a volume sensor.

8. An apparatus according to claim 5, wherein said pump control means comprises a counter that counts cycles of said pump.

9. An apparatus according to claim 5, wherein said peristaltic pump has a flow rate adjustable between approximately 60 and approximately 220 milliliters per minute.

10. An apparatus according to claim 1, further comprising a bracket for holding said container in operative relationship with said agitator means, wherein said automatic dispensing means dispenses said solvent into said container when said container is held in said bracket.

11. An apparatus according to claim 1, wherein said dispensing means dispenses said solvent at a flow rate of at most approximately 4 milliliters per second.

* * * * *